United States Patent
Bosma et al.

(10) Patent No.: US 10,821,902 B2
(45) Date of Patent: Nov. 3, 2020

(54) REARVIEW ASSEMBLY WITH LIGHTED BEZEL

(71) Applicant: GENTEX CORPORATION, Zeeland, MI (US)

(72) Inventors: Bradley A. Bosma, Hudsonville, MI (US); Michael F. Lisowski, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 16/403,744

(22) Filed: May 6, 2019

(65) Prior Publication Data
US 2019/0351830 A1    Nov. 21, 2019

Related U.S. Application Data

(60) Provisional application No. 62/672,856, filed on May 17, 2018.

(51) Int. Cl.
| | |
|---|---|
| *B60R 1/12* | (2006.01) |
| *B60R 1/02* | (2006.01) |
| *B60Q 1/26* | (2006.01) |
| *G02F 1/157* | (2006.01) |
| *B60R 1/08* | (2006.01) |

(52) U.S. Cl.
CPC .......... *B60R 1/1207* (2013.01); *B60Q 1/2665* (2013.01); *B60R 1/025* (2013.01); *B60R 1/081* (2013.01); *G02F 1/157* (2013.01); *B60R 2001/1215* (2013.01); *B60R 2001/1223* (2013.01)

(58) Field of Classification Search
CPC ....... B60R 1/1207; B60R 1/025; B60R 1/081; B60R 2001/1223; B60R 2001/1215; B60Q 1/2665; G02F 1/157
See application file for complete search history.

(56) References Cited

U.S. PATENT DOCUMENTS

| | | | |
|---|---|---|---|
| 6,441,943 B1 * | 8/2002 | Roberts | G02F 1/133308 |
| | | | 359/267 |
| 7,706,046 B2 | 4/2010 | Bauer et al. | |
| 2002/0159270 A1 * | 10/2002 | Lynam | B60K 35/00 |
| | | | 362/492 |

(Continued)

FOREIGN PATENT DOCUMENTS

RU    73289 U1    5/2008

OTHER PUBLICATIONS

International Search Report dated Aug. 22, 2019, for corresponding PCT application No. US2019/030813, 3 pages.

(Continued)

*Primary Examiner* — Kevin Quarterman
(74) *Attorney, Agent, or Firm* — Price Heneveld LLP; Bradley D. Johnson

(57) ABSTRACT

An edge-lit rearview assembly comprising a housing; a mirror element having a perimeter and disposed within the housing; a bezel extending around at least a portion of the perimeter of the mirror element; at least one circuit board; at least one light source in electrical communication with the circuit board; wherein the at least one light source is in optical communication with at least a portion of the bezel.

18 Claims, 4 Drawing Sheets

(56) References Cited

U.S. PATENT DOCUMENTS

| | | | |
|---|---|---|---|
| 2005/0195488 A1* | 9/2005 | McCabe | G02F 1/161 |
| | | | 359/603 |
| 2009/0091489 A1* | 4/2009 | Banko | B60R 1/12 |
| | | | 342/20 |
| 2013/0279147 A1 | 10/2013 | De Wind et al. | |
| 2014/0293169 A1* | 10/2014 | Uken | B60R 1/12 |
| | | | 349/12 |
| 2015/0124071 A1 | 5/2015 | DeLine et al. | |
| 2016/0264054 A1* | 9/2016 | Uken | B60R 1/088 |
| 2019/0351828 A1* | 11/2019 | McCabe | B60Q 1/24 |
| 2020/0001792 A1* | 1/2020 | Herrmann | B60R 1/1207 |

OTHER PUBLICATIONS

Written Opinion of the International Searching Authority dated Aug. 22, 2019, for corresponding PCT application No. US2019/030813, 4 pages.

* cited by examiner

REARVIEW ASSEMBLY WITH LIGHTED BEZEL

CROSS REFERENCE TO RELATED APPLICATIONS

This application claims the benefit of and priority to U.S. Provisional Patent Application No. 62/672,856, filed on May 17, 2018, entitled Rearview Assembly with Lighted Bezel, the entire disclosure of which is hereby incorporated herein by reference.

FIELD OF THE DISCLOSURE

This disclosure relates generally to a bezel for a rearview assembly for a vehicle, and more particularly to a lighted bezel for a rearview assembly for a vehicle.

SUMMARY OF THE DISCLOSURE

According to an aspect of the present disclosure, an edge-lit rearview assembly for a vehicle may comprise a display element having a perimeter; a bezel extending around at least a portion of the perimeter of the display element; at least one circuit board; and at least one light source in electrical communication with the at least one circuit board and in optical communication with at least a portion of the bezel, and the at least one light source is configured to illuminate at least a portion of the bezel. The display element may comprise a mirror element. The rearview assembly may be a frameless rearview assembly. The rearview assembly may comprise a housing, and the housing may support the mirror element. The edge-lit rearview assembly may further comprise at least one light pipe having a first end and a second end; the first end of the at least one light pipe may be in optical communication with the at least one light source and at least a portion of the at least one light pipe may be in optical communication with at least a portion of the bezel. The at least one light pipe may have a longitudinal surface; and at least a portion of the longitudinal surface may have one of a textured surface and a reflective coating on the surface. The second end of the at least one light pipe may be in optical communication with at least a second light source. The bezel may define a channel; the bezel and associated channel may extend along at least a portion of the perimeter of the display or mirror element; and the at least one light pipe may be at least partially disposed within the channel. The bezel may define a channel; the bezel and associated channel may extend along at least a portion of the perimeter of the display or mirror element; and the at least one light source may be disposed within the channel and in optical communication with the bezel.

The edge-lit rearview assembly may further comprise at least one auxiliary light pipe, each of the at least one auxiliary light pipes having a first end and a second end; the first end of each of the at least one auxiliary light pipes may be in optical communication with the at least one light source; and the second end of each of the at least one auxiliary light pipes may be in optical communication with one of the at least one light pipes. The edge-lit rearview assembly may further comprise at least a second circuit board and a main circuit board; the main circuit board may be in electrical communication with the at least first and second circuit boards. The second end of the at least one light pipe may comprise a reflective surface configured to reflect light toward the first end of the at least one light pipe.

The edge-lit rearview assembly may further comprise at least a second light pipe having a first end and a second end; the first end of the at least second light pipe may be in optical communication with at least a second light source and with the bezel. The bezel may be one of transparent or translucent. The edge-lit rearview assembly may further comprise at least one other vehicle system or computer; the at least one other vehicle system or computer may be in electrical communication with and provide inputs to at least one of the first and second circuit boards to allow the first and/or second circuit board to selectively activate at least one light source based on the received inputs. The edge-lit rearview assembly may further comprise at least one baffle disposed within the bezel; the at least one baffle optically separating the bezel into a plurality of separate lighting zones; and at least one lighting zone may be in optical communication with at least one light source. The bezel may be segmented into different portions by at least one physical break between each portion; the at least one physical break optically separating the bezel into a plurality of separate lighting zones; and the at least one lighting zone may be in optical communication with at least one light source.

According to an aspect of the present disclosure, an edge-lit rearview assembly may comprise a housing; a display or mirror element having a perimeter and supported by the housing; a bezel extending around at least a portion of the perimeter of the display or mirror element; at least one circuit board; and at least one light source in electrical communication with the circuit board; wherein the at least one light source may be in optical communication with at least a portion of the bezel. The edge-lit rearview assembly may further comprise at least one vehicle system; the edge-lit rearview assembly may be in communication with and receive inputs from the at least one vehicle system; the at least one circuit board may be configured to selectively activate the at least one light source in response to the inputs; and wherein activating at least one light source causes at least a portion of the bezel to be illuminated. The edge-lit rearview assembly may further comprise at least one baffle disposed within the bezel; the at least one baffle optically separating the bezel into a plurality of separate lighting zones; and at least one lighting zone may be in optical communication with at least one light source. The edge-lit rearview assembly may further comprise at least one light pipe in optical communication with the at least one light source; the bezel may define a channel; the bezel and associated channel may extend at least partially around the perimeter of the display or mirror element; and the at least one light pipe may be disposed at least partially within the channel. The bezel may define a channel; the bezel and associated channel may extend at least partially around the perimeter of the display or mirror element; and the at least one light source may be disposed at least partially within the channel.

DETAILED DESCRIPTION

Figure 1:
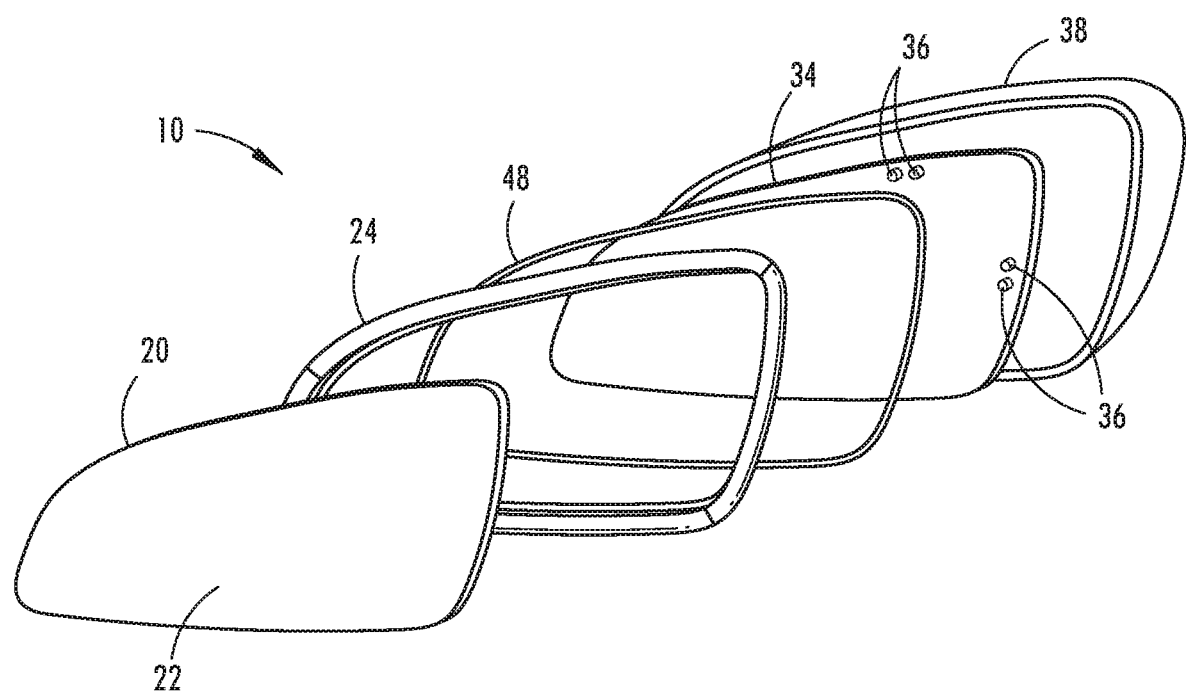
FIG. 1 is an exploded view of the rearview assembly of this disclosure.
Figure 2:
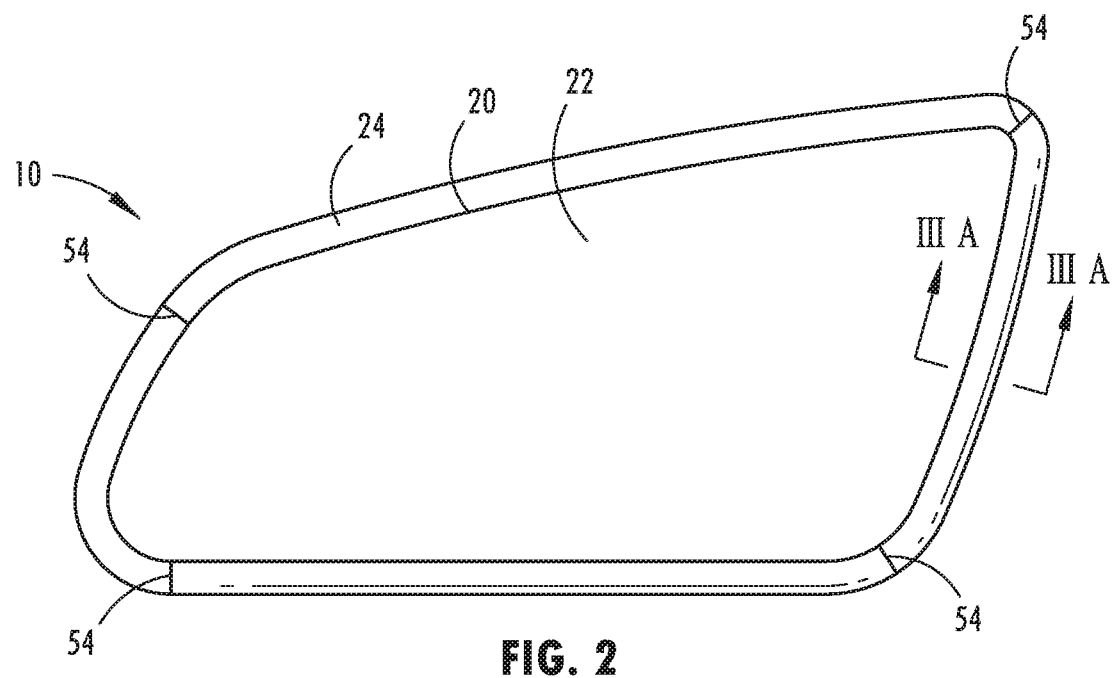
FIG. 2 is a front elevational view of the rearview assembly shown in FIG. 1.

Referring to FIGS. 1 and 2, a rearview assembly, shown generally at 10, may be an inside rearview assembly or an outside rearview assembly, and may be adapted to be installed on a motor vehicle in a conventional manner. Rearview assembly 10 generally faces the rear of the vehicle, and can be viewed by the driver of the vehicle to provide a rearward view. Rearview assembly 10 may comprise a bezel illumination system 15. In some embodiments, bezel illumination system 15 may be in communication with and receive inputs from at least one other vehicle system such as, for example, blind spot warning systems and turn signal indicators. The at least one other vehicle system may comprise a computer or processor. Bezel illumination system 15 may be selectively activated, and may illuminate at least a portion of a bezel 24, in response to certain inputs received from the at least one other vehicle system. In some embodiments, bezel illumination system 15 may have different responses to different inputs. For example, bezel illumination system 15 may periodically illuminate at least a first portion of bezel 24 in a first color upon receipt of an input indicating that a turn signal has been activated, and may illuminate at least a second portion of bezel 24 for a single brief interval with a second color upon receipt of an input indicating that the vehicle doors have been locked. First portion of bezel 24 may coincide partially or completely with second portion of bezel 24, or first portion of bezel 24 may be a completely different portion of bezel 24 from second portion of bezel 24. First and second colors may be the same as one another or may be different from one another.

Rearview assembly 10 may comprise a display element 20 having a viewing surface 22. Display element 20 may be a mirror element. Mirror element 20 may comprise one layer or a plurality of layers. Mirror element 20 may comprise at least one of a mirror, including a prism-type mirror, an electro-optic device, such as an electrochromic device, and a display element, such as a liquid crystal device, for the electronic display of images which may be transmitted to the display element.

Rearview assembly 10 may be a frameless assembly. A bezel 24 may extend around a perimeter 26 of mirror element 20 to protect the edges from damage during normal use. Bezel 24 may comprise a clear or a frosted material, and may be transparent or translucent. Bezel 24 may be constructed from at least one of a transparent or translucent plastic or elastomer, acrylic, polycarbonate, cyclic polyolefin, polyolefin, polysulfone, PVC, epoxy, silicone, polyurethane, polyester, or other materials known to those in the art.

In some embodiments, a housing 38 may support bezel 24. Housing 38 may extend around the rear portion of rearview assembly 10, and may be configured to secure rearview assembly 10 to a vehicle. Bezel 24 may be disposed between mirror element 20 and housing 38. In some embodiments, bezel 24 may support mirror element 20. At least one printed circuit board (PCB) 34 may be disposed in housing and may be disposed at least partially behind mirror element 20, between mirror element 20 and housing 38. At least one light source 36, may be disposed on and/or in electrical communication with at least one PCB 34.

The at least one light source 36 may be in optical communication with bezel 24. Light source 36 may comprise a plurality of different colored individual lights, at least one single light having only a single color, or at least one single light that may produce a variety of colors. Light source 36 may comprise one of an LED light, an RGB LED light, or a plurality of LEDs, each having a single color.

Figure 3A:
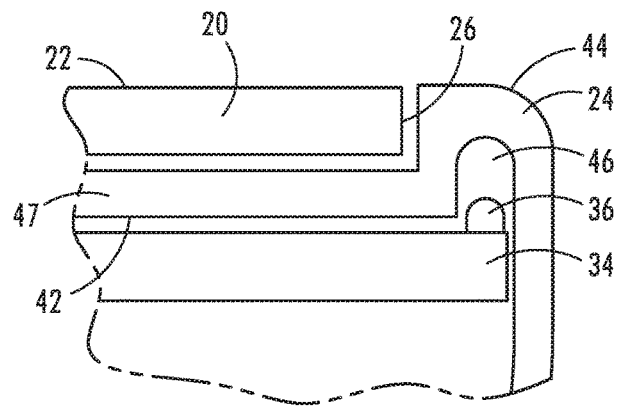
FIG. 3A is a cross-sectional partial view of an embodiment of the rearview assembly as described herein.
Figure 3B:
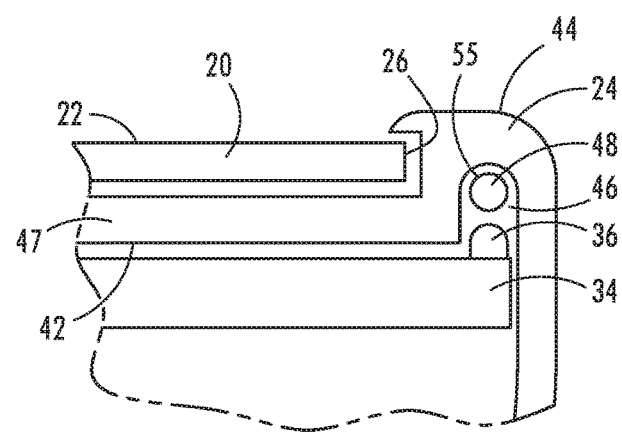
FIG. 3B is a cross-sectional partial view of an embodiment of the rearview assembly as described herein.

As shown in FIG. 3A, bezel 24 may extend along at least a portion of a perimeter 26 of mirror element 20. In some embodiments, bezel 24 may extend over a portion of viewing surface 22 of mirror element 20, as shown in FIG. 3B. Bezel 24 may have a back surface 42 and an outer surface 44 as shown in FIG. 3b. In some embodiments, outer surface 44 may be an arcuate outer surface. A portion of outer surface 44 may be coated with an opaque coating or otherwise modified to block light from being transmitted through bezel. For example, a longitudinal portion of bezel 24 extending closest to viewing surface 22 may be modified to block light from being transmitted to viewing surface 22, or a section of bezel may be modified to prevent certain longitudinal sections of bezel 24 from being illuminated.

At least a portion of bezel 24 may define a channel 46, and channel 46 in bezel 24 may extend along at least a portion of perimeter 26 of mirror element 20 on back surface 42 of bezel 24. A supporting portion 47 of bezel 24 may support at least mirror element 20.

As shown in FIGS. 4A-4E, in some embodiments, a single primary light pipe 48 may extend around at least a portion of perimeter 26 of mirror element 20 behind bezel 24. At least a portion of primary light pipe 48 may be disposed adjacent to and in optical communication with bezel 24 to facilitate the transmission of light from light pipe 48 to bezel 24. In some embodiments, at least a portion of primary light pipe 48 may be disposed within or behind channel 46.

Primary light pipe 48 may have a first end 58, a second end 60, and a side surface 55 extending therebetween. In some embodiments, at least a portion of side surface 55 of primary light pipe 48 may have a textured surface or a coating of reflective material to allow light to escape from side surface 55 of primary light pipe 48. Light leaving primary light pipe 48 may travel through at least a portion of bezel 24 adjacent to or in proximity to a lighted portion of primary light pipe 48, and may illuminate outer surface 44 of bezel 24.

Figure 4A:
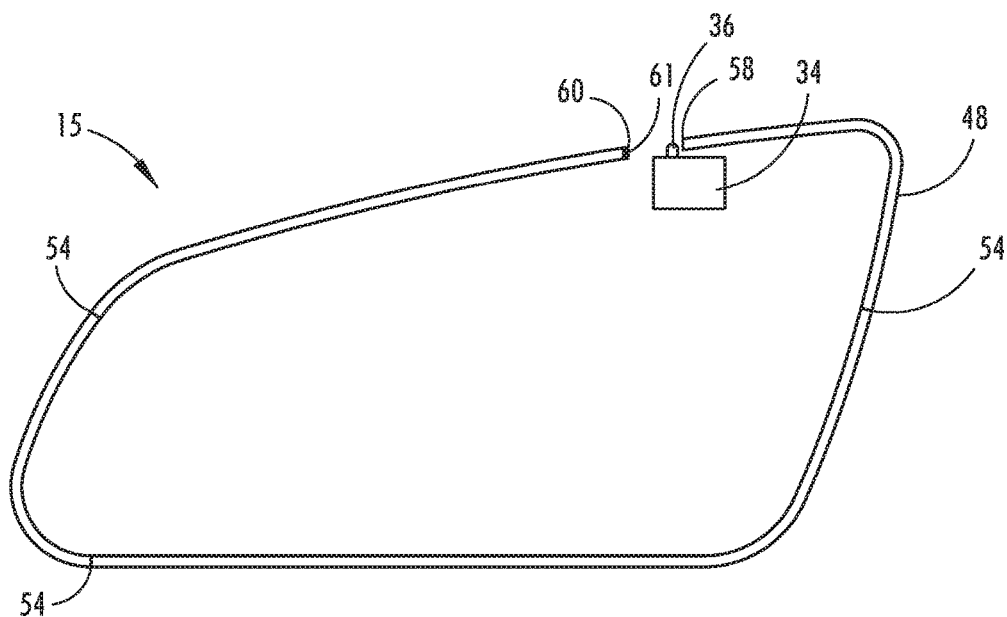
FIG. 4A is a front view of a portion of an embodiment of the bezel illumination system as described herein.
Figure 4B:
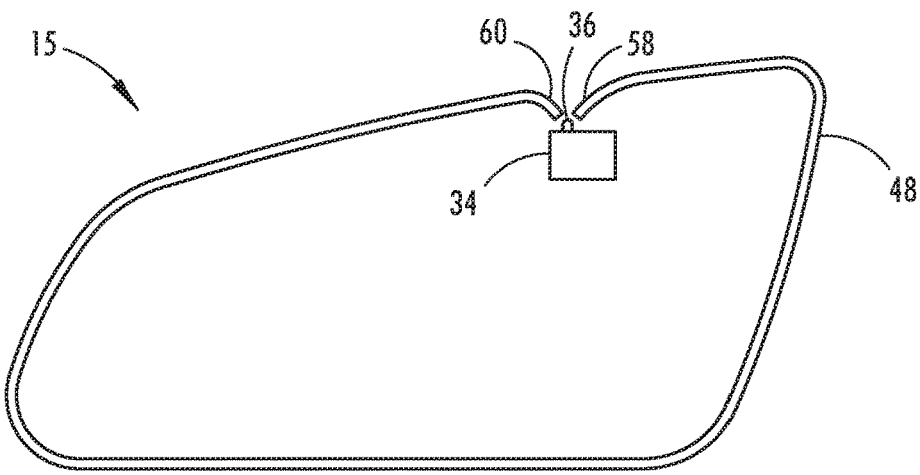
FIG. 4B is a front view of a portion of an embodiment of the bezel illumination system as described herein.
Figure 4C:
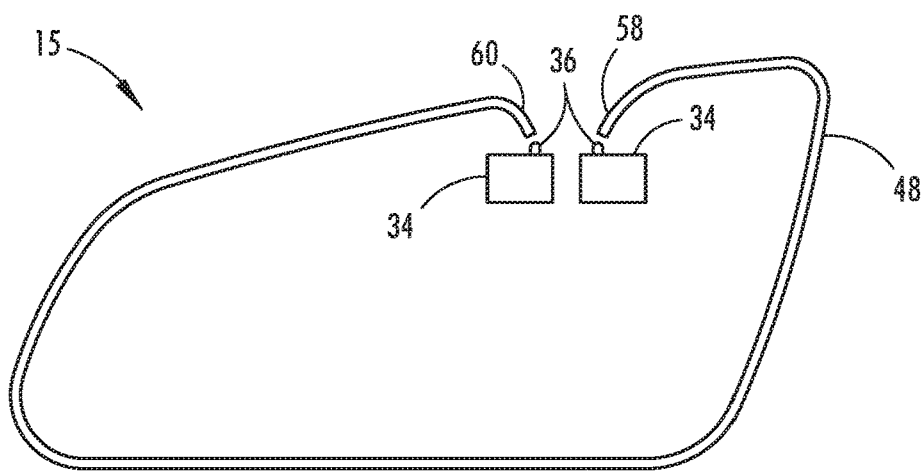
FIG. 4C is a front view of a portion of an embodiment of the bezel illumination system as described herein.

In some embodiments, a light source 36 may be disposed in proximity to and in optical communication with first end 58 of primary light pipe 48. In some embodiments, a reflective surface 61 may be disposed at second end 60 of primary light pipe 48 as shown in FIG. 4A. Upon reaching reflective surface 61 at second end 60 of primary light pipe 48, light may be reflected back toward first end 58 of primary light pipe 48. In some embodiments, primary light pipe 48 may be configured to allow light from light source 36 to enter both first and second ends 58, 60 of primary light pipe 48 as shown in FIG. 4B. In some embodiments, a second light source 36 may be disposed at second end 60 of primary light pipe 48 as shown in FIG. 4C, and light may enter primary light pipe 48 from both first and second ends 58, 60. PCB 34 may be in electrical communication with light source or light sources 36, and may control the activation of light source 36. When different colors of light are possible, for example if light source 36 comprises an RGB LED or a plurality of LEDs, each in a different color, PCB 34 may control the color displayed by light source 36.

In some embodiments, at least one auxiliary light pipe 50 may be in optical communication with primary light pipe 48, and may transmit light thereto. A first end of each of the at least one auxiliary light pipes 50 may be disposed near and in optical communication with light source 36. Light source 36 may be disposed by the first end of each of the at least one auxiliary light pipes 50. In some embodiments, a plurality of auxiliary light pipes 50 may all be associated with and in optical communication with a single light source as shown if FIG. 4E. A second end of the plurality of auxiliary light pipes 50 may be disposed adjacent to and in optical communication with a portion of primary light pipe 48, thereby allowing light to be transmitted from light source 36 to primary light pipe 48.

In some embodiments, a plurality of PCBs 34 may each be in electrical communication with one or more light sources 36. A main PCB 35 may be in electrical communication with the plurality of PCBs 34 and may control the plurality of PCBs 34. In some embodiments, main PCB 35 may also be in direct electrical communication with at least one light source 36.

In some embodiments, bezel illumination system 15 may comprise a single main PCB 35 in electrical communication with a flexible PCB (not shown) that may extend generally along at least a portion of perimeter 26. One or a plurality of light sources 36 may be disposed in flexible PCB, and at least one auxiliary light pipe 50 may be in optical communication with each light source 36. Main PCB 35 may control and coordinate light sources 36 disposed on flexible PCB.

In some embodiments, a first end of each of a plurality of auxiliary light pipes 50 may be disposed in optical communication with a light source 36 and a second end of each of the plurality of auxiliary light pipes 50 may be disposed along primary light pipe 48. Each auxiliary light pipe 50 and associated light source 36 may operate independently from other auxiliary light pipes 50 and light sources 36. Thus, a first light source 36 for a first auxiliary light pipe 50 may activate and display a red light while a second light source 36 for a second auxiliary light pipe 50 may activate and display a blue light and a third light source 36 for a third auxiliary light pipe 50 may activate no lights. This may result in different portions of bezel lighting up and different colors showing along different portions of bezel 24.

Figure 4D:
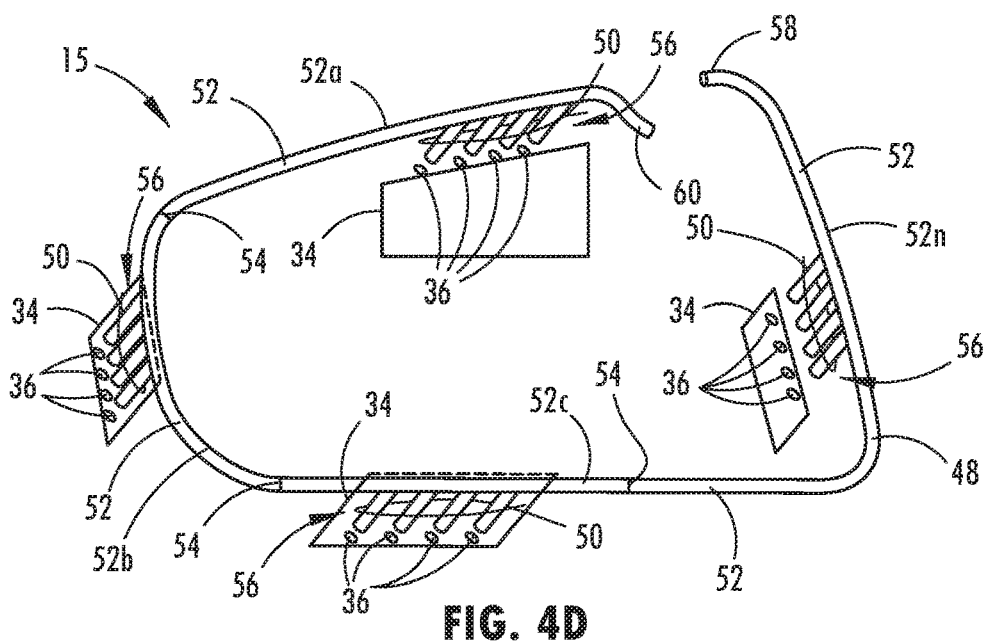
FIG. 4D is a front view of a portion of an embodiment of the bezel illumination system as described herein.
Figure 4E:
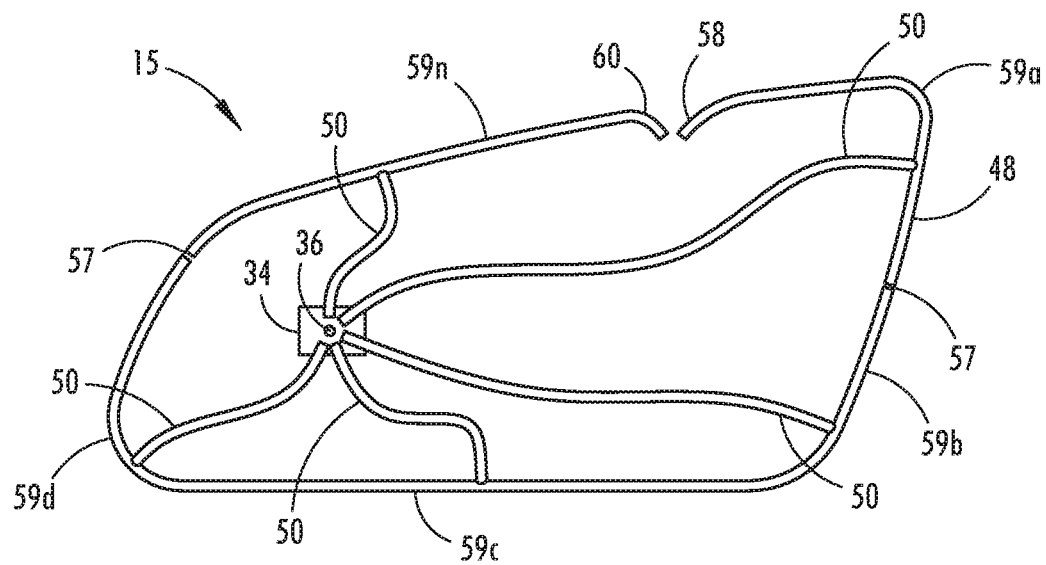
FIG. 4E is a front view of a portion of an embodiment of the bezel illumination system as described herein.

In some embodiments, a single PCB 34 may be in optical communication with a plurality of auxiliary light pipes 50 in clusters or groups 56, each cluster 56 comprising more than one auxiliary light pipe 50, as shown in FIG. 4D. PCB 34 may have a plurality of light sources 36 disposed thereon. A first end of each auxiliary light pipe 50 may be in optical communication with a light source, and a second end of each auxiliary light pipe 50 may be in optical communication with and disposed adjacent to side surface 55 of primary light pipe 48. A plurality of clusters 56 of auxiliary light pipes 50 may be disposed along primary light pipe 48. In some embodiments, each cluster 56 may have a different colored light source 36 associated with each auxiliary light pipe 50. For example, a cluster 56 having three auxiliary light pipes 50 may have a red light source 36 associated with a first auxiliary light pipe 50, a green light source 36 associated with a second auxiliary light pipe 50, and a blue light source 36 associated with a third auxiliary light pipe 50.

In some embodiments, a single PCB 34 may be associated with the plurality of clusters 56 of light sources 36. A hole or opening may be defined in the center of PCB 34 to allow mirror controls to extend from rear of housing 38 to mirror element 20. Alternatively, bezel illumination system 15 may comprise a plurality of PCBs 34 with a separate PCB 34 associated with light sources 36 for each cluster 56 of auxiliary light pipes 50. A main PCB 35 may be in electrical communication with the plurality of PCBs 34, and may coordinate and control them.

Lighting of each cluster 56 of auxiliary light pipes 50 may operate independently from the lighting of the other cluster or clusters 56. Thus, for example, a PCB 34 associated with a first cluster 56 may activate a red light while a PCB 34 associated with a second cluster 56 may activate a blue and a green light and a PCB 34 associated with a third cluster 56 may not activate a light. This may result in different portions of bezel 24 lighting up and different portions of bezel 24 displaying different colors.

In some embodiments, at least one light source 36 may be disposed directly in channel 46 of bezel. The at least one light source 36 may be in electrical communication with a PCB 34, and PCB 34 may selectively activate the at least one light source 36. Light from the at least one light source 36 may travel through bezel 24 to illuminate outer surface 44 of bezel 24. In some embodiments, bezel illumination system 15 may comprise a plurality of light sources 36 disposed in channel 46 and a plurality of PCBs 34; each PCB 34 in electrical communication with and capable of selectively activating at least one light source 36. Bezel illumination system 15 may further comprise a main PCB 35 in electrical communication with the plurality of PCBs 34. Main PCB 35 may selectively activate and control the plurality of light sources 36 through the plurality of PCBs 34.

In some embodiments, at least one of PCB 34 and main PCB 35 may be in communication with and receive inputs from at least one other vehicle system. The at least one other vehicle system may comprise a computer or processor. The at least one other vehicle system may include, for example, blind spot warning systems or turn signal indicators. Bezel illumination system 15 may selectively illuminate at least a portion of a bezel 24, in response to certain inputs received from the at least one other vehicle system. In some embodiments, bezel illumination system 15 may have different responses to different inputs, such as, for example, lighting the entire bezel 24 in a first color in response to a first input and lighting only a portion of bezel 24 in a second color in response to a second input.

In some embodiments, baffles or dividers 54 in bezel 24 may divide bezel 24 into different zones 59a-59n as shown in FIG. 4D, and may result in sharp divisions between zones, with each zone 59a-59n having the capability of displaying a different color or different level of lighting from those in neighboring zones 59a-59n. In some embodiments, bezel 24 may be segmented into different portions with a physical break 57 between each portion to optically separate bezel 24 into different zones 59a-59n. In some embodiments, there may be no baffles or breaks and, consequently, no sharp demarcations or boundaries between different zones 59a-59n of lighting. The coloring or lighting of different lighting zones 59a-59n may bleed into the coloring or lighting of adjacent zones, as shown in elements 59b-59d in FIG. 4E. This may allow for aesthetically pleasing lighting effects in bezel 24.

Each lighting zone 59a-59n of bezel 24 may be associated with at least one light source 36. The different zones 59a-59n may allow peripheral lighting of rearview assembly 10 to be used to indicate information to viewers. For example, intermittently lighting a portion, such as a particular zone or multiple zones 59a-59n, of bezel 24 in a particular color may indicate that a turn signal has been activated, while lighting a different portion or lighting the same portion in a different color may indicate that there is an obstacle in the driver's blind spot. Lighting of the entire bezel 24 may be used to indicate, for example, that vehicle doors are locked or that the vehicle has entered an autonomous driving mode. And lighting effects, such a constant soft glow, chasing lights, or gradual color transitions in bezel lighting may provide visually pleasing effects.

Figure 5:
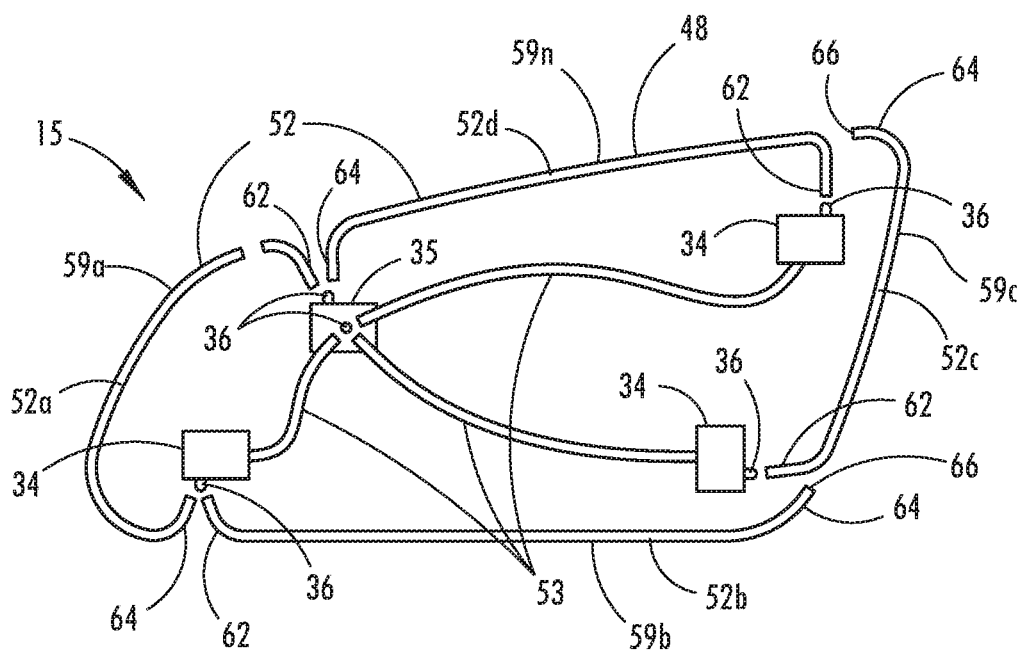
FIG. 5 is a front view of a portion of an embodiment of the bezel illumination system as described herein.

Referring now to FIG. 5, in some embodiments, a plurality of light pipes 52a-52n, each having a first end 62 and a second end 64, may each extend partially around perimeter 26 of mirror element 20, while the plurality of light pipes as a whole may extend around most or all of perimeter 26. In some embodiments, at least a portion of the plurality of light pipes 52a-52n may be disposed adjacent to bezel 24 to facilitate the transmission of light from light pipes 52a-52n to bezel 24. In some embodiments, at least a portion of light pipes 52a-52n may be disposed within or behind channel 46. In some embodiments, at least a portion of side surfaces 55 of at least one of the plurality of light pipes 52a-52n may have one of a textured surface and a coating of reflective material to allow light to escape through side surfaces 55 of light pipes 52a-52n. Light escaping from the sides of light pipes 52a-52n may illuminate the portion of bezel 24 in proximity to illuminated light pipes 52a-52n. Each light pipe 52a-52n may be a different lighting zone 59a-59n for bezel 24.

In some embodiments, light source 36 may be disposed at first end 62 of each of the plurality of light pipes 52a-52n, as shown in FIG. 4D. In some embodiments, two light pipes 52a, 52b may share a single light source 36, and each light pipe 52 may represent a different zone of bezel 24. In some embodiments, a reflective surface 66 may be disposed at second end 60 of at least one of the plurality of light pipes 52a, and may reflect transmitted light back toward first end 58 of light pipe 52a. In some embodiments, a second light source 36 may be disposed at second end 64 of at least one of the plurality of light pipes 52b, and light may thereby enter light pipe 52b from both first end 58 and second end 60.

In some embodiments, each of the plurality of light pipes 52a-52n may be illuminated independently from the other light pipes 52a-52n. For example, a first light pipe 52a may be illuminated while a second and third light pipe 52b-52n are not, or a first light pipe 52a may be illuminated with a green light while a second light pipe 52b may be illuminated with a red light.

At least one PCB 34 may be provided, and each light source 36 may be in electrical communication with the at least one PCB 34. In some embodiments, a single PCB 34 may control all the light sources 36. In some embodiments, PCB 34 may define a hole or opening or may have a general U-shaped configuration (not shown) to allow mirror controls to have access to mirror element 20. In some embodiments, bezel illumination system 15 may comprise a plurality of PCBs 34. Each PCB 34 may be in electrical communication with at least one light source 36, and may control the illumination of at least one of the plurality of light pipes 52a-52n. A main PCB 35 may be in electrical communication with the plurality of PCBs 34, and the electrical communication may be through a plurality of communication lines 53, each communication line linking one of PCB 34 with another PCB 34 or main PCB 35. Main PCB 35 may control and coordinate actions of the plurality of PCBs 34. In some embodiments, main PCB 35 may also directly control at least one light source 36.

Bezel illumination system 15 may be configured to light one section of bezel 24 at a time or to light the entire bezel 24. Bezel illumination system 15 may be configured to light different sections or zones 59a-59n of bezel 24 in different colors, and colors may change over time. For example, bezel illumination system 15 may cause a portion of bezel 24 to be lit in a first color, and after a period of time or a particular event, the lighting of the portion of bezel 24 may change to a second color. Bezel illumination system 15 may produce a bright light, a soft glow, or a light that transitions from a low lighting level to a high one or vice versa, and may produce different light levels in different zones 59a-59n of bezel 24. Bezel illumination system 15 may light one section or zone 59a-59n of bezel 24 with a bright light while lighting another zone 59a-59n with a soft glow, and the colors of the lighting displayed in one zone 59a-59n may differ from the colors displayed in an adjacent zone 59a-59n. Bezel illumination system 15 may produce intermittent lighting, constant lighting, or a single brief flash or flicker of light. Bezel illumination system 13 may allow the packaging of multiple independent light sources into single integrated solution, and may allow the combining of lighting functions from currently discrete modules into a single unique lighting solution.

The present illustrated embodiments reside primarily in combinations of method steps and apparatus components related to a rearview assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, and unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting. It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An edge-lit rearview assembly for a vehicle comprising:
    a display element having a perimeter;
    a bezel extending around at least a portion of the perimeter of the display element;
    a first circuit board;
    at least one light source in electrical communication with the first circuit board; and
    at least one light pipe in optical communication with the at least one light source and having a first end and a second end;
    wherein the bezel defines a channel;
    wherein the bezel and associated channel extend along at least a portion of the perimeter of the display element;
    wherein the at least one light pipe is at least partially disposed within the channel; and
    wherein the at least one light source is configured to illuminate at least a portion of the bezel.

2. The edge-lit rearview assembly of claim 1, wherein the rearview assembly is a frameless rearview assembly and wherein the display element is a mirror element.

3. The edge-lit rearview assembly of claim 1, wherein the first end of the at least one light pipe is in optical communication with the at least one light source and wherein at least a portion of the at least one light pipe is in optical communication with at least a portion of the bezel.

4. The edge-lit rearview assembly of claim 3, wherein the at least one light pipe has a longitudinal surface; and wherein at least a portion of the longitudinal surface has one of a textured surface and a reflective coating on the surface.

5. The edge-lit rearview assembly of claim 3, wherein the second end of the at least one light pipe is in optical communication with at least a second light source.

6. The edge-lit rearview assembly of claim 3, further comprising at least one auxiliary light pipe, each of the at least one auxiliary light pipes having a first end and a second end; wherein the first end of each of the at least one auxiliary light pipes is in optical communication with the at least one light source; and wherein the second end of each of the at least one auxiliary light pipes is in optical communication with one of the at least one light pipes.

7. The edge-lit rearview assembly of claim 6, further comprising at least a second circuit board and a main circuit board; wherein the main circuit board is in electrical communication with the at least first and second circuit boards.

8. The edge-lit rearview assembly of claim 3, wherein the second end of the at least one light pipe comprises a reflective surface configured to reflect light toward the first end of the at least one light pipe.

9. The edge-lit rearview assembly of claim 3, further comprising at least a second light pipe having a first end and a second end; wherein the first end of the at least second light pipe is in optical communication with at least a second light source and with the bezel.

10. The edge-lit rearview assembly of claim 1, wherein the bezel and associated channel extend along at least a portion of the perimeter of the display element.

11. The edge-lit rearview assembly of claim 1, wherein the bezel is one of transparent or translucent.

12. The edge-lit rearview assembly of claim 7, further comprising at least one other vehicle system or computer; wherein the at least one other vehicle system or computer is in electrical communication with and provides inputs to at least one of the first and second circuit boards to allow the at least one of the first and second circuit boards to selectively activate at least one light source based on the received inputs.

13. The edge-lit rearview assembly of claim 1, further comprising at least one baffle disposed within the bezel; wherein the at least one baffle optically separates the bezel into a plurality of separate lighting zones; and wherein at least one lighting zone is in optical communication with at least one light source.

14. The edge-lit rearview assembly of claim 1; wherein the bezel is segmented into different portions by at least one physical break between each portion; wherein the at least one physical break optically separates the bezel into a plurality of separate lighting zones; and
    wherein the at least one lighting zone is in optical communication with at least one light source.

15. An edge-lit rearview assembly comprising:
    a housing;
    a display element having a perimeter and supported by the housing;
    a bezel extending around at least a portion of the perimeter of the display element;
    at least one circuit board;
    at least one light source in electrical communication with the circuit board; and
    at least one light pipe having a first end and a second end in optical communication with the at least one light source;
    wherein the bezel defines a channel; and
    wherein the at least one light pipe is at least partially disposed within the channel.

16. The edge-lit rearview assembly of claim 15, further comprising at least one vehicle system; wherein the edge-lit rearview assembly is in communication with and receives inputs from the at least one vehicle system; wherein the at least one circuit board is configured to selectively activate at least one light source in response to the inputs; and wherein activating at least one light source causes at least a portion of the bezel to be illuminated.

17. The edge-lit rearview assembly of claim 15, further comprising at least one baffle disposed within the bezel; wherein the at least one baffle optically separates the bezel into a plurality of separate lighting zones; and wherein at least one lighting zone is in optical communication with at least one light source.

18. The edge-lit rearview assembly of claim 15, wherein the bezel and associated channel extend at least partially around the perimeter of the display element.

* * * * *